No. 753,206. PATENTED FEB. 23, 1904.
M. NIRDLINGER.
ART OF MANUFACTURING VEHICLE TIRES.
APPLICATION FILED MAY 21, 1900.
NO MODEL.
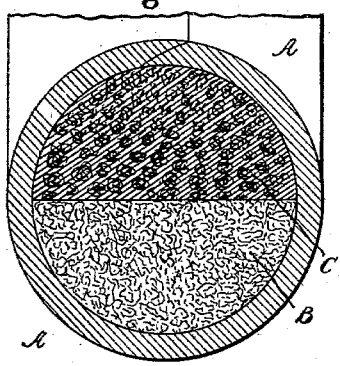
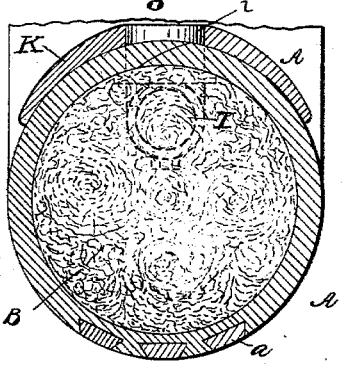
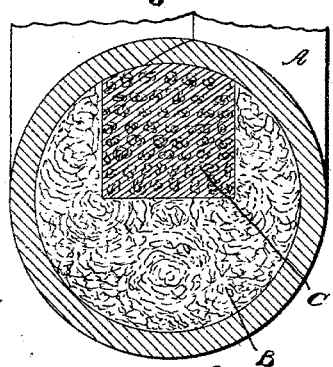
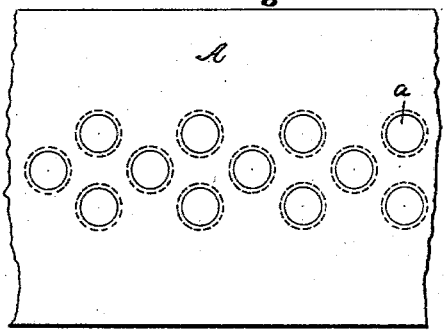
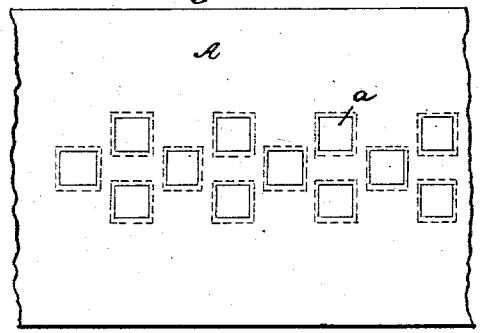
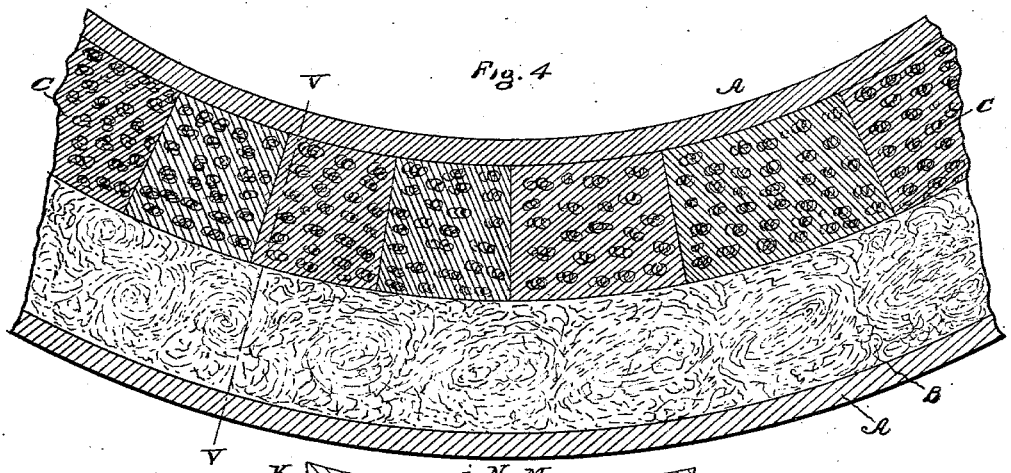
Witnesses:
Albert H. Williams Jr.
R. B. Cavanagh
Inventor.
Max Nirdlinger
by H. H. Bliss
Attorney.

No. 753,206.

Patented February 23, 1904.

UNITED STATES PATENT OFFICE.

MAX NIRDLINGER, OF PHILADELPHIA, PENNSYLVANIA.

ART OF MANUFACTURING VEHICLE-TIRES.

SPECIFICATION forming part of Letters Patent No. 753,206, dated February 23, 1904.

Application filed May 21, 1900. Serial No. 17,463. (No model.)

*To all whom it may concern:*

Be it known that I, MAX NIRDLINGER, a citizen of the United States, residing at Philadelphia, in the county of Philadelphia and State of Pennsylvania, have invented certain new and useful Improvements in the Art of Manufacturing Vehicle-Tires, of which the following is a specification, reference being had therein to the accompanying drawings.

My present invention relates to an improved process in the art of manufacturing vehicle-tires and to the product thereof, comprising a composition of a relatively light and permanently-elastic character, which is comparatively inexpensive of production and which is adapted to serve as a substitute for rubber for many purposes, and especially in the construction of tires for bicycles, automobiles, or other vehicles, and also comprising a tire made of such composition.

In order to make the invention more clearly understood, I will describe a practical manner of carrying the same into effect without limiting my improvements to the precise procedure or ingredients or proportions thereof hereinafter specified.

For the production of sixty pounds, more or less, of the composition I take fifteen pounds of glue, preferably diamond-glue, and soak and soften the same in water or other suitable solvent. Twenty-five pounds of glycerin or petrea are heated to about 100° Fahrenheit in a steam-jacketed or other suitable vessel or kettle, and to the same is added the soaked glue. These ingredients are mixed and the mixture heated to or kept at a temperature of about 100° Fahrenheit. I then add to this mixture twenty pounds of saccharin material, preferably glucose or grape-sugar, in a warmed condition. These ingredients are thoroughly mixed, keeping them at about 100° Fahrenheit, and to the mixture is added a gas-generating substance or substances, such as six ounces of saleratus. I then beat, stir, or agitate the entire mixture very rapidly, as by a power-driven rotary beater, until it foams freely, the saleratus causing the production of spaces or cells in and throughout the mass. This makes of the composition when set a permanently-elastic sponge, the exact character of which may be regulated by the proportions and nature of the ingredients. I then add one ounce of tannin and six and a-half ounces of powdered alum. Great care should be exercised to keep the ingredients and mixture at 100° Fahrenheit, or thereabout. From the time that the first ingredient is placed in the mixing kettle or vessel it is desirable that it and the subsequent ingredients be stirred or agitated moderately. When the time for producing the gas or air spaces or cells arrives, either by the use of gas-generating substances or by the injection of compressed air, the stirring of the mixture should be very rapid, thereby promoting the action of the gas-generating substances and the formation of gas or air spaces evenly throughout the mass. Especially should such rapid stirring take place in the composition at the point where it leaves the agitating and compressing vessel to enter the tire-tube. The mixture is now ready for use in the manufacture of tires, as by molding to form a core or partial core for a resilient tire or by being injected while fluid into a tire-tube to form a yielding filler for the same; but until finally molded or injected as a filler the composition should be maintained at about the heat above specified. To this end it is necessary that the mixing and stirring kettles or vessels, compressors, and injectors which may be employed and the tire-tube covering or outer portion be kept as warm as the said mixture, or thereabout.

The preferred method of using the composition in the manufacture of tires is to force or inject the same in a warm and semifluid condition into a molded and continuous tire-tube, envelop, or covering of vulcanized rubber, preferably by the action of compressed air forced into a closed vessel or kettle containing the composition and connected with the tire-tube. Sufficient air or other pressure is applied to force the composition through a check or other valve or other suitable opening in the tire so as to fill all parts of the interior of the latter and cause an intimate union between the filler and the interior walls of the tube.

The space-producing, sponging, and lightening effect produced in the mixture and resulting composition by the saleratus and alum may under certain conditions otherwise be secured by the injection or forcing of air into the mixture to fill it with air-spaces; but I prefer the first-mentioned method, as the chemical production of the sponging or lightening gases makes the composition more homogeneous and the mixture may be forced into the tire-envelop before the generation of the sponging-gases has ceased, thereby insuring the confinement of the gases and their desired effect in the composition. I may also aerate the composition containing the gas-generating substance to promote the action of the latter and to form air cells or spaces in addition to the gas-spaces.

In addition to the employment of said composition as a tire-filler I may provide for increasing the durability of the tire by fitting the tread or wearing-surface of the same with metal studs or blocks or strips of other suitable material, such as leather, which are molded into the outer portion or rubber covering of the tire in the process of its manufacture and vulcanization in such manner as to be securely held from displacement. I may also more or less fill up the inner half (felly side) of the tire-covering with a series of strips or blocks of cork of suitable shape, such as half-round or square, which strips or blocks are built into or secured to the inner surface of the covering in the process of manufacture. Thereafter in using my above-mentioned composition the remainder of the interior of the covering is completely and tightly filled by the composition in a semifluid state under pressure, as already described.

In the accompanying drawings I have illustrated vehicle-tires embodying various features of my invention, in which—

Figure 1 is a cross-section of a tire. Figs. 2 and 3 are views of a portion of the tread, showing two forms of relatively hard wearing studs or blocks inserted therein. Fig. 4 is a longitudinal section of a portion of the tire, showing another form of my invention. Fig. 5 is a cross-section on line $v\,v$, Fig. 4. Fig. 6 is a similar view with a somewhat different form of cork blocks. Fig. 7 is a longitudinal section of a portion of the tire, illustrating the filling-tube.

Referring to the drawings, A indicates the flexible covering of the tire, preferably formed of vulcanized india-rubber or composition thereof. In this covering are or may be secured wearing blocks, studs, or strips $a$, of steel, leather, or other suitable material harder and more durable than the substance of the covering. These studs are securely held in the covering, preferably by being molded therein or riveted in in the process of manufacture of said covering. They may be round or rectangular, Figs. 2 and 3, or may be of any other preferred and suitable form. The covering A is wholly or partly filled with the above-described (or any equivalent) elastic and spongy composition B. In Fig. 1 the covering is shown as entirely filled by such composition. In Figs. 4, 5, and 6 the inner or felly side of the tire is lined and more or less filled by solid blocks or strips C of cork, ground cork, or equivalent substance, which may either be half-round, as illustrated, or which may be square, Fig. 6, or of other shape. The remaining space within the covering—that at the outer or tread side—is completely filled with the composition B.

The heating, mixing, and injecting apparatus used in my above-described process may be of any suitable character and construction—such, for instance, as that described in my application Serial No. 2,358 or like that set forth in my application Serial No. 17,462.

It will be understood that other ingredients than those specified and capable of making a fluid or viscid composition in which air or gas spaces may be produced and which will serve as a yielding tire-filler may be employed for carrying my invention into effect.

I preferably combine with and insert in the tire-tube and felly a special form of tubular connection by means of which the thick and viscid filler may be introduced into the tire-tube in such manner that notwithstanding its thick and partly-fluid character it may be caused to rapidly enter the tube and completely fill all parts of the same. Said device is shown in Fig. 7, in which I represents a filling-tube of bent or elbow form set and fixed within the tire-tube. The outer end $i$ of said tube is at or projects from the felly side of the tube and may fit within an aperture in the felly K, as shown. The inner end $i'$ of the tube is turned in a direction substantially parallel with a tangent to the tire, so that the filling material is directed longitudinally of the tire and is prevented from clogging the entrance. At the rear side of the tube I is formed an air-exit aperture $k$, through which the air within the tire rapidly exhausts as the filler enters from the pipe or opening $i'$. Within the pipe I is formed a valve-seat $i^2$, against which acts an outwardly-closing check-valve M, the opening through the valve-seat and the said valve being of considerable diameter to permit of the free entrance of the viscid filling composition. Said valve has a longitudinal seat $m$, which fits upon a guide-rod $m'$, fixed in the lower portion of tube I, and is normally pressed toward the valve-seat by a spring $m^3$ surrounding said rod. The outer end of the tube I is closed and sealed after the filling operation by a screw-plug N, thereby maintaining the desired pressure within the tire-tube of the confined elastic filler and the air or gas within the spaces or cells of the same.

What I claim is—

1. The herein-described improvement in the art of manufacturing vehicle-tires which consists in mixing together in a heated condition glue, glucose or grape-sugar, glycerin or petrea, producing air or gas spaces in and throughout such composition, and introducing the same in the last-mentioned condition and while fluid, under pressure into a tire tube, covering or envelop.

2. The herein-described improvement in the art of manufacturing vehicle-tires which consists in mixing together in a heated condition glue, glucose or grape-sugar, glycerin or petrea, and a gas-generating substance or substances, and introducing the same while fluid into a tire tube, covering or envelop.

3. The herein-described improvements in the art of manufacturing vehicle-tires which consists in inserting into a tire tube or envelop a mass of strips or blocks of solid material, such as cork, arranging said solid blocks in a series in the inner side of the chamber within the tube, and inserting in that part of the chamber in the tube which is outside of the said strips or blocks a composition more or less viscid in consistency adapted to form a spongy, elastic body when hard, and applying pressure to said mass when it is being inserted into the tube, substantially as set forth.

4. The herein-described improvements in the art of manufacturing vehicle-tires which consists in the mixing together in a heated condition a glutinous material, a viscid material, and a gas-generating substance and introducing the composition into a tire tube or envelop under pressure.

5. The herein-described method for the manufacture of vehicle-tires which consists in making a composition of fluid-like character capable of setting to form an elastic body, and containing materials adapted by chemical combination to produce gas and render the body porous, and introducing said composition in a fluid condition into a flexible tire tube or sheath, substantially as set forth.

6. The herein-described method for the manufacture of vehicle-tires which consists in making a composition of fluid-like character capable of setting to form an elastic body, and containing saleratus for the purpose of producing gas and of rendering the body porous, and introducing said composition in a fluid condition into a flexible tire tube or sheath.

In testimony whereof I affix my signature in presence of two witnesses.

MAX NIRDLINGER.

Witnesses:
GEO. C. HAZELTON, Jr.,
S. S. WILLIAMSON.